US008116054B2

(12) United States Patent
Vicente et al.

(10) Patent No.: US 8,116,054 B2
(45) Date of Patent: Feb. 14, 2012

(54) UNIVERSAL RATING PLUG FOR ELECTRONIC TRIP UNIT

(75) Inventors: Nataniel Barbosa Vicente, Prospect, KY (US); Brian Patrick Lenhart, Louisville, KY (US); Stephen James West, Louisville, KY (US); Todd Greenwood, Pewee Valley, KY (US)

(73) Assignee: General Electric Company, Schenectady, NY (US)

( * ) Notice: Subject to any disclaimer, the term of this patent is extended or adjusted under 35 U.S.C. 154(b) by 555 days.

(21) Appl. No.: 12/344,828

(22) Filed: Dec. 29, 2008

(65) Prior Publication Data

US 2009/0122453 A1 May 14, 2009

Related U.S. Application Data

(63) Continuation-in-part of application No. 11/617,952, filed on Dec. 29, 2006, now abandoned.

(60) Provisional application No. 61/045,068, filed on Apr. 15, 2008.

(51) Int. Cl.
*H02H 3/08* (2006.01)
*H02H 9/02* (2006.01)

(52) U.S. Cl. ....................................... 361/93.3; 361/111

(58) Field of Classification Search ................. 361/93.3, 361/115
See application file for complete search history.

(56) References Cited

U.S. PATENT DOCUMENTS

| | | | | |
|---|---|---|---|---|
| 4,300,110 | A | 11/1981 | Bayer et al. | |
| 4,958,252 | A | 9/1990 | Murphy | |
| 5,136,454 | A | 8/1992 | Halferty et al. | |
| 5,825,643 | A | 10/1998 | Dvorak et al. | |
| 5,877,691 | A * | 3/1999 | Suptitz et al. | 340/638 |
| 5,877,925 | A * | 3/1999 | Singer | 361/42 |
| 6,356,426 | B1 * | 3/2002 | Dougherty | 361/102 |
| 7,605,659 | B2 * | 10/2009 | Hughes | 330/282 |

FOREIGN PATENT DOCUMENTS

| | | | |
|---|---|---|---|
| EP | 11134763 | A3 | 7/2001 |
| EP | 1189324 | A | 3/2002 |

* cited by examiner

*Primary Examiner* — Jared Fureman
*Assistant Examiner* — Christopher Clark
(74) *Attorney, Agent, or Firm* — Global Patent Operation; Stephen G. Midgley

(57) ABSTRACT

A rating plug for an electronic trip unit is disclosed. The rating plug has a housing with a plurality of switches disposed within the housing, each of the switches positionable in one of two positions. The settings of the switches establish a digital signature associated with the rating plug, providing for a universal rating plug that can be used on any circuit breaker that is accepting of the rating plug and that has a sensor value equal to or greater than the rating plug current rating. For instance, a rating plug having a 1000 Amp rating can be used on any circuit breaker sensor for use at or above 1000 A.

5 Claims, 6 Drawing Sheets

UNIVERSAL RATING PLUG FOR ELECTRONIC TRIP UNIT

CROSS REFERENCE TO RELATED APPLICATIONS

This application is a continuation-in-part application of U.S. application Ser. No. 11/617,952, filed Dec. 29, 2006 now abandoned. This application also claims the benefit of the filing date of U.S. Application Ser. No. 61/045,068, filed Apr. 15, 2008. The contents of both of these applications are incorporated herein by reference in their entirety.

BACKGROUND OF THE INVENTION

1. Field of the Invention

The invention described herein relates to the field of circuit breakers, and more particularly, to the field of rating plugs for circuit breakers having electronic sensors or trip units.

2. Brief Description of Related Art

Patented disclosures of circuit breakers having electronic trip units ("ETU"s) and removable rating plugs for setting the circuit breaker ampere rating may be found, for example, in U.S. Pat. Nos. 4,672,501; 4,181,922; 6,804,101 and 6,678, 135.

Circuit breakers are widely used to protect electrical lines and equipment such as cables, motors, and other loads in an electric circuit by measuring an electrical current. The circuit breaker monitors the current through an electrical conductor and "trips" to open the electrical circuit and thus interrupt current flow through the circuit provided that certain predetermined criteria are met.

An electronic trip unit is a device that is conventionally used in conjunction with a circuit breaker to control the circuit breaker's current (and, or voltage) versus time trip response. In this capacity, the trip unit typically receives information relating to current through the circuit breaker via current sensors, such as current transformer ("CT") and/or Rogowski-type current sensors, and processes the information to provide feedback to a user or to provide trip functionality to the associate circuit breaker. When the sensed current exceeds a pre-defined threshold, the trip unit issues a trip signal, in some cases after a predetermined time delay. Generally, the trip signal is communicated to a solenoid, such as a circuit breaker flux shifter or other suitable device, configured to cooperate with a tripping mechanism to separate the circuit breaker contacts and interrupt the current in the protected circuit.

The time versus current trip characteristics are, in part, a function of a maximum continuous current permitted by the circuit breaker. The predetermined time delay and issuance of the trip signal is an inverse function of the magnitude of the sensed current. For very large magnitude overcurrents, such as would be produced by a fault, a central processing unit ("CPU"), such as a microcomputer, of the trip unit is also programmed to issue a trip signal instantaneously.

The circuit breaker may, of course, also be used to monitor voltage, and trip in a case of any disturbance in predetermined voltage conditions such as under-voltage, over-voltage, and voltage imbalance conditions.

Conventional circuit breaker tripping criteria includes, for example, the maximum continuous current permitted in the protected circuit. The maximum continuous current the circuit breaker is designed to carry is known as a frame rating or current rating of the circuit breaker. As long as the sensed current remains below a predetermined protection rating (such as long-time, short-time, ground fault, or instantaneous), the breaker will remain not trip.

Typically, the ETU records the current flowing through the circuit breaker or motor overload relay via the current sensors, phase amplifiers and an A/D converter. The current sensors may also provide power to the trip unit. The current through the protected electric power circuit is typically sensed by means of current transformers and a corresponding voltage signal is supplied to a signal processor within the ETU circuit. Conventional current sensing systems for the ETU employ a current sensor in each phase and in the neutral, if used. The corresponding voltage signal is often conditioned by a rating resistor in a rating plug, as described below.

Conventional trip units employ a rating plug having a rating resistor, or set of resistors, comprising predetermined resistor values which set a current rating (i.e., gain) which is the maximum continuous current permitted in the electronic circuit. Typically, the at least one rating resistor can function as a "burden resistor" located in series with the secondary current transfer current, or a resistor in the feedback loop of the gain circuit operation amplifier, or a combination of both. The rating resistor provides an analog voltage gain proportional to the sensed current in the protected circuit. The rating resistor value is selected to provide a predetermined voltage when a current proportional to the maximum, continuous current permitted in the protected circuit passes through it. Thus, the value of the rating resistor accordingly sets the ampere rating of the corresponding circuit interrupter. A common electronic circuit interrupter could therefore operate over a wide range of ampere ratings by merely changing the value of the burden resistor within the electronic trip circuit.

In order to provide for adjustment of the current rating so that the circuit breaker can be used to protect circuits with different maximum continuous currents, it is known to incorporate the rating resistor in a replaceable rating plug that may be selectively inserted into the breaker. Careful selection of the rating plug allows the rating resistor to be selected without requiring customized tailoring of each trip unit circuit for each circuit breaker ampere rating. A common ETU can thus operate over a wide range of circuit breaker ampere ratings by merely changing the rating plug.

In practice, however, since operators of the circuit breakers may employ various types of circuit breakers they may be required to stock large numbers of spare trip units in case a particular trip unit for a particular type of circuit breaker fails. The required stocking of the large numbers of the spare trip units may be expensive in terms of occupied space and associated costs.

The rating plug changes the operating curve for actuation of a breaker having an electronic circuit interrupter, thus changing the ampere rating of the breaker. For safety purposes, the circuit breaker must be properly configured to provide the type of protection judged by the customer or plant engineer to be appropriate. Therefore, modification of the protection rating or the current vs. trip time response curve is very serious matter and should be handled appropriately and in a way that prohibits errors. Not all rating plugs are compatible with all electronic trip units. Therefore, a known problem is to ensure that a rating plug is compatible with the electronic trip unit into which it is to be inserted.

It is important to prevent an electronic circuit interrupter from being inserted within an electrical distribution circuit for which the circuit interrupter is over-rated. It is perhaps equally important not to insert a circuit interrupter within an electric power distribution circuit for which the circuit interrupter is under-rated, as so-called "nuisance-tripping" could occur. It is also important to insure that a circuit interrupter is not inserted within an electric power distribution circuit with no rating plug.

For safety's sake, all electronic trip units with interchangeable rating plugs are required to reject incorrect combinations of rating plugs and trip units. Such rejection is typically accomplished by the placement of pins within the receptacle in the trip unit into which the rating plug is to be inserted. The pins, which are normally located on the sides of the trip unit housing, interfere with protrusions on the side of the rating plug housing. Thus, prevention of installing rating plugs that are not compatible with a specific circuit breaker is prevented by keying the rating plug housing and the rating plug receptacle thereby preventing incompatible rating plugs from being installed in the circuit breaker.

While workable, this prior art system has several drawbacks and disadvantages. One of these is that the interference between pins and protrusions does not occur until the rating plug is almost fully inserted into the trip unit, often resulting in the user mistakenly believing that insertion of the rating plug has been properly completed. Another problem is that the pins are independent elements, i.e., they are not part of the rating plug housing or the trip unit housing, and as such a pin may be removed by someone tampering with the unit, and the user will not know whether a pin should be present or not.

BRIEF DESCRIPTION OF THE INVENTION

A rating plug for an electronic trip unit is provided. The rating plug has a housing configured to removably secure the rating plug to the trip unit, and a plurality of switches disposed within the housing, each of the switches positionable in one of two positions. The settings of the switches establish a digital signature associated with the rating plug.

A circuit breaker trip unit rating plug mountable to a trip unit, the trip unit comprising a first plurality of switches for varying voltage gain in an amplifier is provided. The circuit breaker trip unit rating plug comprises a housing configured to removably secure the rating plug to the trip unit, and a second plurality of switches configured to control an analog switch on/off operation and operation of the first plurality of switches to indicate a specific fixed percentage de-rating and/or sensor and/or frame rating for the rating plug.

A circuit breaker having an electronic trip unit is provided. The circuit breaker comprises a current sensor configured to provide a secondary analog signal proportional to the primary current sensed to the trip unit, an amplifier in signal communication with the current sensor comprising a first plurality of switches configured to adjust the voltage gain of said amplifier, a microprocessor in signal communication with said amplifier, configured to provide a trip signal when said sensed primary current exceeds a predetermined threshold limit, said microprocessor comprising an internal analog to digital converter configured to process said analog signal from said current sensor and a non-volatile memory for storing the predetermined threshold limits, a rating plug having a housing configured to removably secure said rating plug to said trip unit, a second plurality of switches disposed within said rating plug housing adapted to control said first plurality of switches on/off operation to indicate a specific percentage de-rating and/or sensor and/or frame rating for said plug, wherein each of said second plurality of switches is positionable in one of two positions.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining several embodiments of the invention in detail, it is understood that the invention is not limited in its application to the details of the construction and to the arrangements of the components set forth in the following description or illustrated in the drawings. The embodiments described herein are capable of being practiced and carried out in various ways. Also, it is to be understood, that the phraseology and terminology employed herein are illustrative only and should not be regarded as limiting.

The above-described and other features and advantages of the present disclosure will be appreciated and understood by those skilled in the art by reference to the following detailed description, drawings, and appended claims.

BRIEF DESCRIPTION OF THE DRAWINGS

Reference is now made briefly to the accompanying drawings in which.

DETAILED DESCRIPTION

Figure 1:
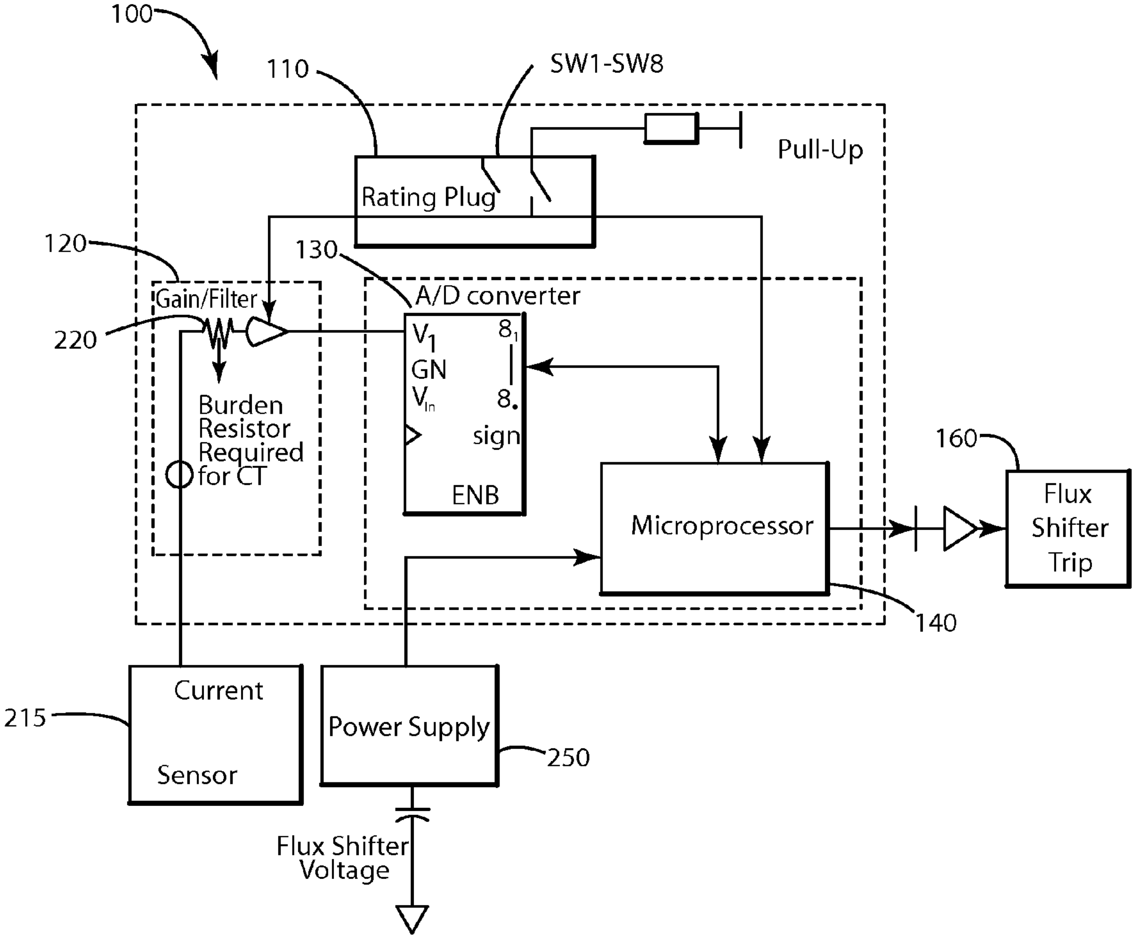
FIG. 1 is a block diagram depicting the main components of an electronic trip unit according to an embodiment of the present invention.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

Embodiments of the invention are discussed below with reference to FIGS. 1-6 and reference numerals associated therewith.

An embodiment of the invention, as shown and described by the various figures and accompanying text, provides a rating plug that will contain a series of switches and a connector for affixing the plug to a trip unit. The switches, such as for example toggle switches, will be set to a predetermined state at the time of manufacture to identify the rating plug value (such as from 80 Amps to 6400 Amps, for example, and/or the de-rating factor. This allows the circuit breaker to be de-rated (i.e., a lowering of the effective current capability for example, from a 2000 ampere capability de-rated to 40% or a set of similar parameters). By utilizing this rating plug method, the phase gain is set immediately for protection and a microprocessor in the trip unit is able to read the switch settings for metering purposes. For example, if a user of a circuit breaker were to purchase and install a 2000 Ampere circuit breaker, and realize subsequently that the proper circuit breaker for an intended load should be 800 Ampere, instead of purchasing and installing a new circuit breaker for the intended load of 800 Amperes, the user would merely remove and replace the existing rating plug to a 40% (i.e., 40% of 2000 is 800) de-rating plug.

This methodology will allow for a universal rating plug, that is, a rating plug that can be used on any circuit breaker having a current sensor that is rated equal or greater than the rating plug value. For instance, a rating plug having a 1000 Amp rating can be used on any circuit breaker sensor for us at or above 1000 A.

The rating plug provides information to central processing unit ("CPU") of the trip unit in the form of a number representative of nominal maximum trip amperes called the "rating plug current rating". This rating plug current rating represents a value of amperes upon which other circuit breaker adjustments are made, which are made in "proportion" to the rating plug current rating. Each current sensor associated with the circuit breaker (three sensors for a three-phase circuit breaker for example) has its own sensing ratio that represents a sensor current rating.

Upon power-up, the CPU reads the setting of the rating plug switches to determine the "rating plug current rating", and reads the sensor value (sensor current rating) for the current sensor of the circuit breaker, the sensor value being stored in the memory of the trip unit. The CPU sets the appropriate analog gains in the trip unit and uses a unique software constant to match the rating plug current rating value to the sensor value. For example, if the sensor has a ratio of 1000 to 1, and the rating plug has a nominal rating of 500 Amps, then the CPU, upon reading the switch settings representative of 500 Amps and reading the sensor ratio that represents a sensor value of 1000, calculates a trip unit gain factor by dividing the sensor ratio (1000) by the switch setting (500) to arrive at a gain of two (2), meaning that that sensor output signals must be multiplied by 2 (1000:2, instead of 1000:1) to create a ratio of 500 to 1 as indicated by the rating plug current rating.

In previous embodiments of rating plugs, the plug needed to know what sensor value it would be associated with because it communicated the rating plug/sensor ratio to the trip unit circuitry via an analog means (such as a burden resistor for example), rather than communicate an absolute value representative of a current rating that empowers the digital processor to calculate the required ratio. As such, embodiment of the rating plug with switches disclosed herein provides a digital signature for the rating plug current rating rather than an analog signature. This allows the same rating plug having a nominal current rating value of 500 Amps to be used in combination with various sensors having different sensor current values, where all of the combinations yield a trip operating condition at the nominal current rating of 500 Amps regardless of the sensor used.

In an exemplary embodiment, as shown in FIG. 1, the electronic trip unit 100 comprises a rating plug 110 coupled with the electronic trip unit 100, a processing unit (hereinafter referred to as a microprocessor) 140 and a gain control unit 120. The gain control unit 120, and the microprocessor 140 are disposed on a control board (not shown). A current sensor 215, such as a Current Transformer (CT) powers the main components of the electronic trip unit ("ETU") 100. Typically, the CT 215 provides an alternate secondary current output that is proportional to the primary current flowing through it. For example, if a 1000 A current is flowing through the primary coil of the transformer, a lesser current, as for example 200 mA will flow out of the CT 215 to the ETU 100. In some embodiments, the ETU 100 will use this secondary output for both power to operate and for sensing the current flow. If, of course, the ETU 100 uses a current transformer as the current sensor 215, a burden resistor 220 will be necessary to generate the voltage feeding into the Gain/Filter circuit 120 (as shown in FIG. 1, a general feed line directed towards such a burden resistor 220 is depicted within the gain/filter circuitry).

Alternatively, a Rogowski coil type current sensor 215 may be substituted in place of the current transformer for sensing to provide a derivative secondary voltage output that is proportional to the high level primary current flowing through it. The Rogowski current sensor 215 is a device for measuring alternating current or high speed current pulses, and consists of a helical coil of wire with the lead from one end returning through the center of the coil to the other end resulting in both terminals being at the same end. The complete coil is then wrapped around the feed line whose current is to be measured and, since the voltage is proportional to the rate of change of current in the feed line, the output signal from the coil will be proportional to the current flow.

As further depicted in FIG. 1, voltage from the current transformer burden resistor 220 or the Rogowski coil sensor 215 output is passed through a Gain/Filter circuit 120. The Gain/Filter circuit 122 is designed to provide filtering to remove any spurious electric 'noise' from the signal; analog integration in the case of Rogowski coil sensor 215 input; and uses the rating plug 110 selection (40% to 100% of the breaker) to set the operational amplifier ("op-amp") (not shown) gain within the Gain/Filter circuit 120 in order to get the same voltage value on the microprocessor 140 analog/digital converter 130 ("A/D") at the circuit breaker rating. The following example is given to more fully explain the relationship between the rating plug selection to set the op-amp gain.

Example 1

As an example to more clearly demonstrate the gain/filter circuitry shown in FIG. 1, assume the existence of a circuit breaker rated at 1000 A, and a rating plug rated at 100% of the breaker rating of 1000 A. By applying a load current of 1000 A, the voltage following the A/D converter will be 2 volts. Now, assume that a user wishes to change the circuit breaker rating by changing the rating plug to one rated at 40% rather than 100%. Effectively, the change will result in an equivalent 400 A circuit breaker, as it will now be rated at 40% of 1000 A. The current applied will now be 400 A, and the A/D output voltage will remain at 2 volts. Thus, if the circuit breaker is rated for 1000 A (100%), 2 volts will be obtained when the rated current is applied; and if the breaker is rated at 400 A, the A/D output of 2 volts will still be obtained when the rated current (400 A) is applied. In each of these two instances, the circuit breaker will trip if the rated current is exceeded.

The trip unit will recognize if the rating plug is set for one or the other amperages (either 400 A or 1000 A in this example, but other de-rating percentages are possible) even if both ratings provide 2 volts on the microprocessor A/D. This is possible because metering is a relatively slow process that is not as critical as protection, i.e., tripping. For metering, the microprocessor reads the switches preprogrammed into the rating plug to determine what is the breaker reading.

Figure 2:
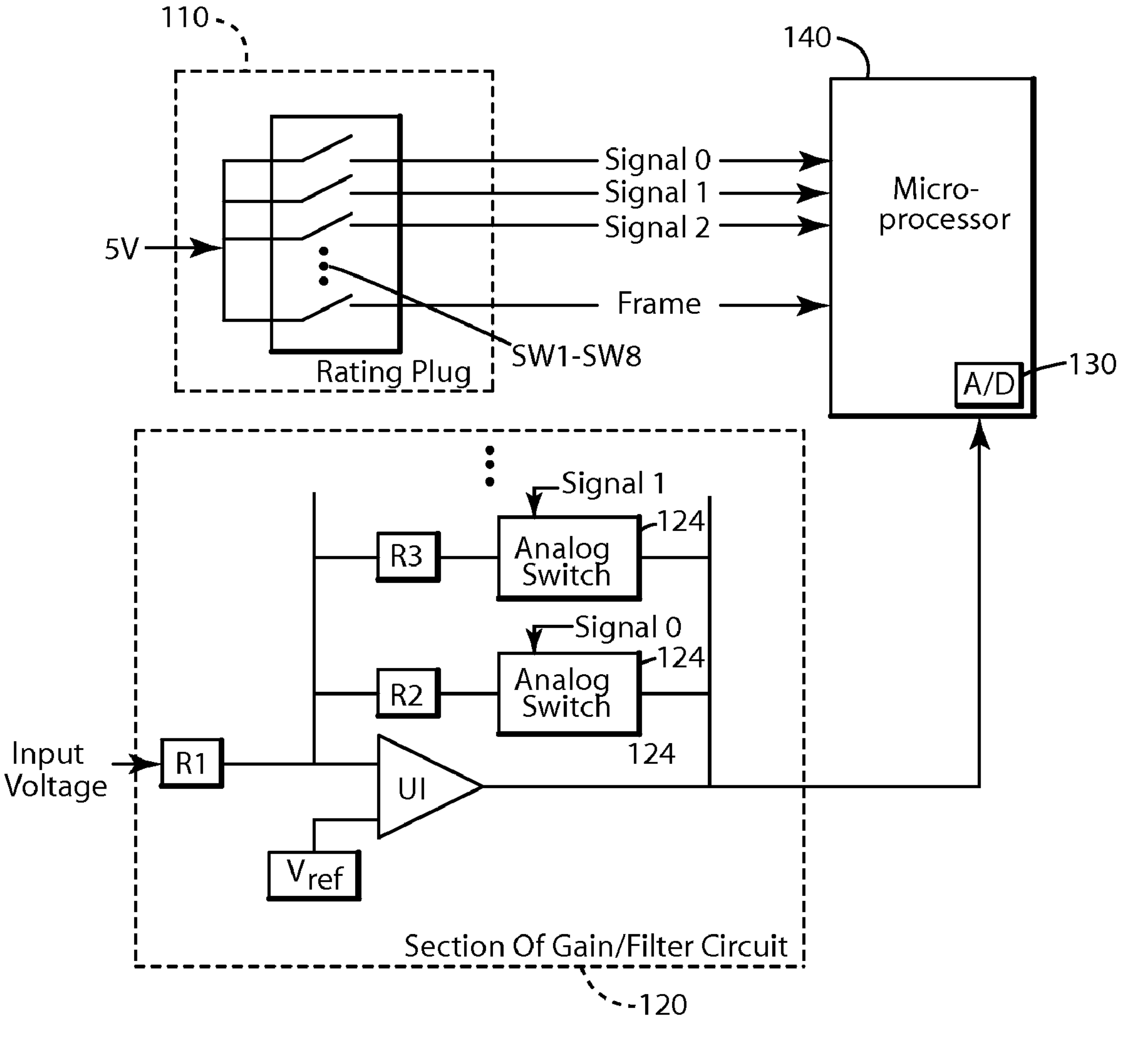
FIG. 2 depicts a more detailed view of the rating plug and gain/filter conditioning interface of FIG. 1.

As depicted in FIG. 2, the rating plug is provided with a 5 volt input line to energize the plug which contains a series of switches (SW1-SW8) that are used to select and identify de-rating percentages (40% and 100% being exemplified in Example 1, however, other percentages may be selected as depicted, for example, in Table 1) and/or sensor rating and/or frame and/or additional related breaker/trip unit functions. The information that the switches (SW1-SW8) provide is fed as signals (signal0, signal1, signal2, and FRAME being depicted in FIG. 2) to the microprocessor, and the microprocessor uses this signal to determine the de-rating percentage which is used for metering purposes. The individual switch setting (signal0, signal1, signal2 . . . ) controls the analog switch 124 on/off operation. By controlling the analog switch 124 operation in this manner, a different gain can be set for each percentage de-rating as generally shown in Table 1. As discussed below, the rating plug switches (SW1-SW8) are pre-set at the time of the plug's manufacture to indicate a specific percentage de-rating and/or sensor and/or frame ratings. The section of the gain/filter conditioning circuit 120 interface depicted in FIG. 2 contains resistors (R1, R2, and R3), an operational amplifier (U1) in addition to analog switches that receive signals from the rating plug 110. The output of the gain/filter 120, as depicted in both FIGS. 1 and 2, is fed into an A/D converter 130.

The switches (SW1-SW8) may, for example, be configured in accordance with the following Table 1, to provide for the specified de-rating percentages. In this example, only seven rating plug toggle switches are used:

TABLE 1

| Switches 7 6 5 4 3 | Frame | Current Sensor | Switches 2 1 0 | % Derating |
|---|---|---|---|---|
| 0 0 0 0 0 | Error | | 0 0 0 | Error/40% |
| 0 0 0 0 1 | 1 | 150 A | 0 0 1 | 100% |
| 0 0 0 1 0 | 1 | 200 A | 0 1 0 | 90% |
| . . . | . . . | . . . | 0 1 1 | 80% |
| 0 1 1 0 0 | 2 | 2000 A | 1 0 0 | 70% |
| . . . | . . . | . . . | 1 0 1 | 60% |
| 1 0 1 0 1 | 4 | 4000 A | 1 1 0 | 50% |
| | | | 1 1 1 | 40% |
| | | | | . . . |

The power supply 250 shown in FIG. 1 is configured to provide 18-24 volts for operation of the flux shifter 160 (FIG. 4), op-amps, and other components requiring this voltage within the circuitry, as well as 5 volts to power the microprocessor 140 and other components requiring this voltage within the circuitry.

The microprocessor 140 used for the electronic trip unit is manufactured to have an internal A/D 130 designed to process the analog signal from the current sensor 215. The microprocessor 140 is also manufactured to contain a non-volatile memory 150 (FIG. 4) for storing for instance, trip unit setpoints and options—parameters that cannot be lost during a power failure. The microprocessor 140 is further configured to provide a trip signal when the sensed current exceeds the preprogrammed threshold limit through the use of the flux shifter 160 (FIG. 4), an electromechanical device that contains a coil and lever which, when energized by a trip signal coming from the microprocessor 140, will cause the circuit breaker to open or trip.

Figure 4:
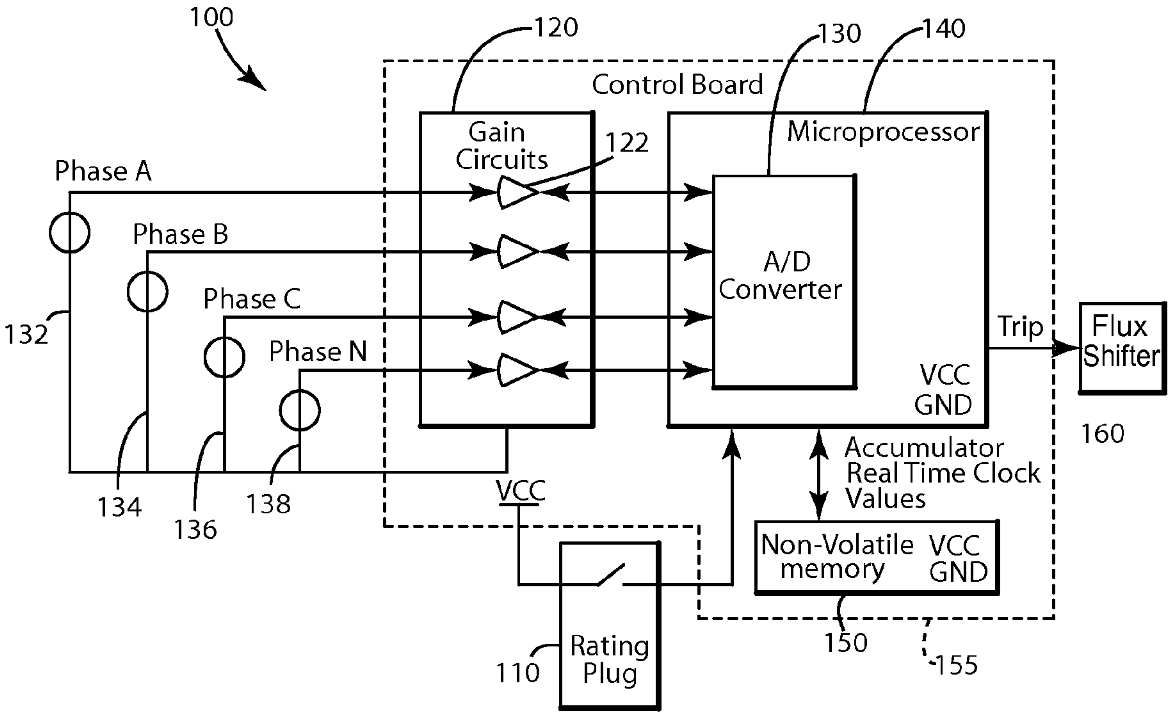
FIG. 4 is a schematic diagram of an electronic trip unit of a circuit breaker that can be implemented with an embodiment of the invention.

Turning now to FIG. 4, there is depicted an electronic trip unit 100 for a three-phase circuit breaker (not shown) having a neutral connection. In the exemplary embodiment, as shown in FIG. 4, the electronic trip unit 100 comprises a rating plug 110 coupled with the electronic trip unit 100, a processing unit (hereinafter referred to as a microprocessor) 140 and a gain control unit 120. The gain control unit 120, the microprocessor 140 and a non-volatile memory 150 are disposed on a control board 155. Secondary current signals from four current sensors 215 (FIG. 1) are in communication with a gain control unit 120 via conductors 132, 134, 136 and 138.

Referring still to FIG. 4, the selected current rating is fed to an input of the microprocessor 140. The microprocessor 140 receives and reads a value of the selected current rating from the rating plug 110 upon power-up.

The gain control unit 120 comprises a plurality of gain circuits 122 for each phase of the circuit breaker. Each gain circuit 122 includes a plurality of gain switches 124 (FIG. 6) which are set by the microprocessor 140 based upon the selected current rating read based on the pre-set ON-OFF positions of switches (SW1-SW8) of rating plug 110, to control a gain of input current of the electronic trip unit 100.

According to an exemplary embodiment, the microprocessor 140 comprises an analog-to-digital (A/D) converter 130 that receives signals from the gain control unit 120 and converts the secondary current levels output from the current sensors 215 (FIG. 1) from analog signals to digital signals to be analyzed by the microprocessor 140.

The gain circuits 122 amplifies each phase signal for phases A, B and C through sections of the respective gain circuits 122, from which the microprocessor 140 measures each amplified signal using the A/D converter 130. The gain control unit 120 also filters electric noise from the signals and minimizes quantization errors.

Figure 5:
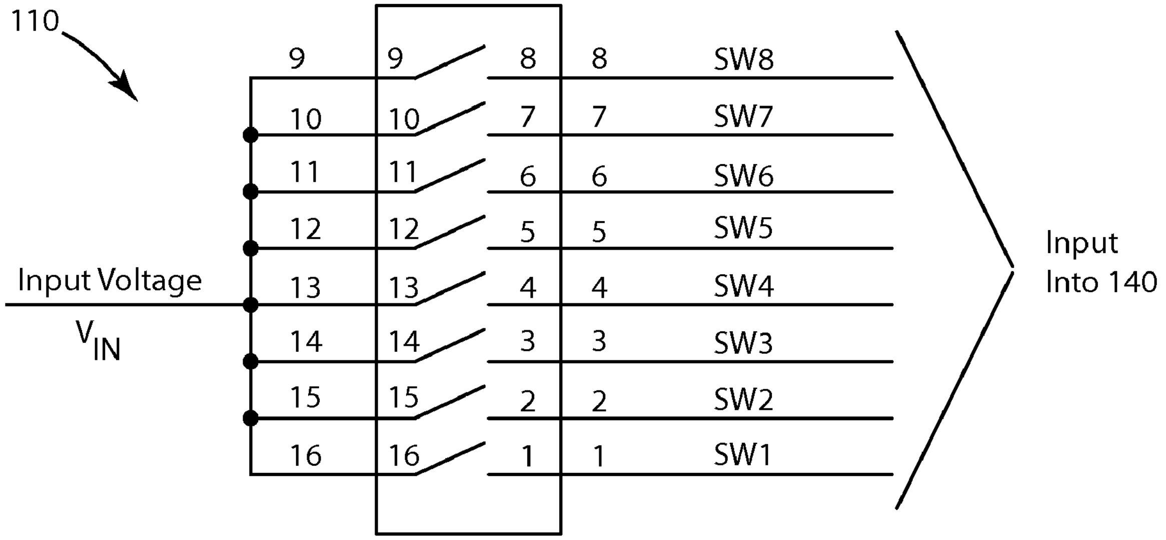
FIG. 5 is schematic diagram of a rating plug according to an embodiment of the present invention that can be implemented with the electronic trip unit of FIG. 4.

FIG. 5 is a schematic diagram of the rating plug of the electronic trip unit 100 of FIG. 4. As shown in FIG. 5, the rating plug 110 is provided with an input voltage $V_{in}$ to energize the rating plug 110 and the rating plug 110 comprises a plurality of switches SW1, SW2, SW3, SW4, SW5, SW6, SW7 and SW8 each configured to indicate a specified current rating for the rating plug 110. That is, according to an exemplary embodiment, the ON-OFF states of switches SW1, SW2, SW3, SW4, SW5, SW6, SW7 and SW8 are preset at the time of manufacture. The number of switches of the rating plug 110 is not limited to any particular number and may vary, as necessary. Presetting the switches to a fixed position configures the rating plug 110 selectively to supply a specified current rating for the electronic trip unit 100.

Figure 6:
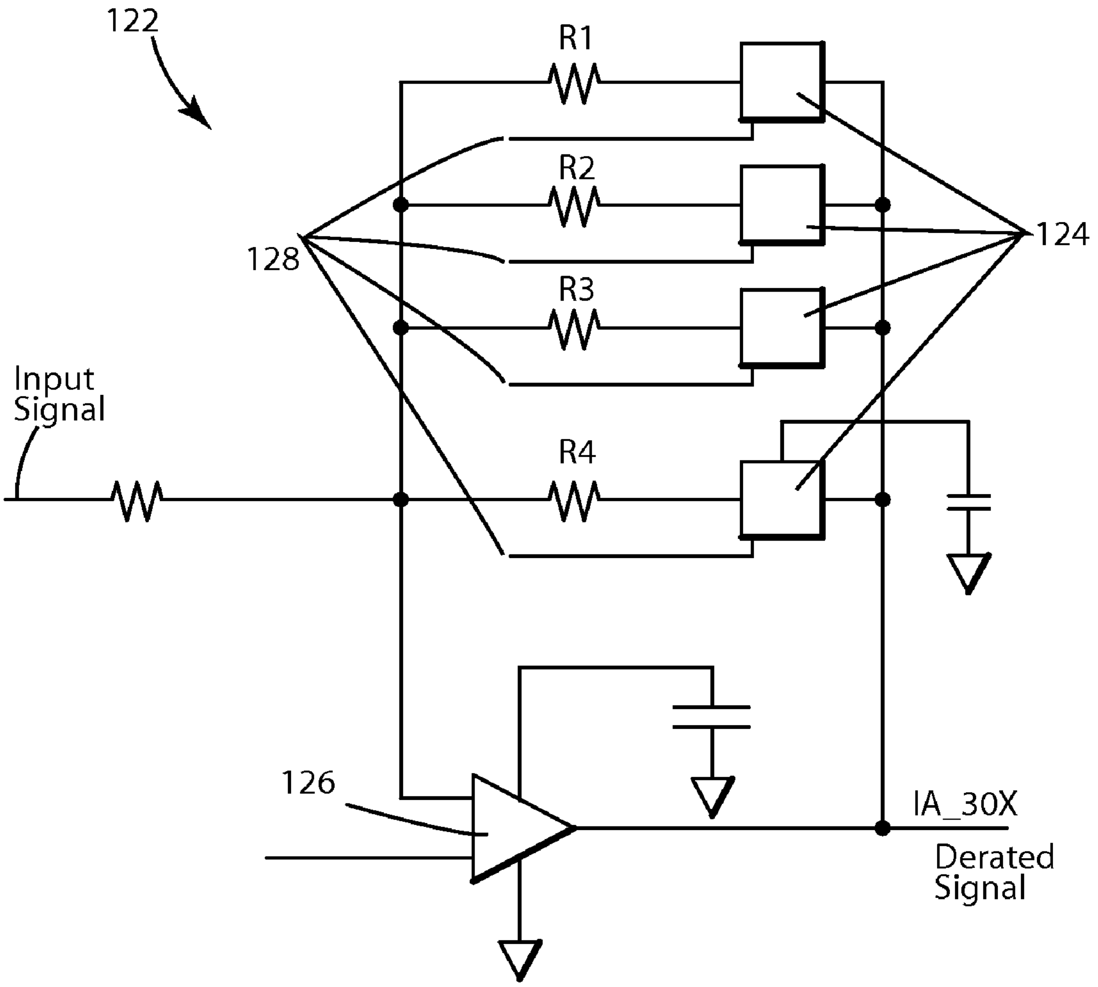
FIG. 6 is a schematic diagram of a gain circuit of the gain control unit of the electronic trip unit FIG. 4.

FIG. 6 is a schematic diagram of a gain circuit of the gain control unit of FIG. 4. As shown in FIG. 6, each gain circuit 122 of the gain control unit 120 comprises a series of resistors R1, R2, R3 and R4, a plurality of gain (i.e., analog) switches 124 and an operational amplifier (hereinafter referred to as a gain amplifier) 126. The gain switches 122 are configured to be selectively enabled and disabled by the microprocessor 140 based on the current rating read by the microprocessor 140, to control the gain of the input current of the electronic trip unit 100. This active gain manipulation of the input current is referred to as "derating". More specifically, derating occurs because rating plug values are equal to or below a maximum rating of the circuit breaker. For example, if a circuit breaker is rated at 1000 Amps, a customer may select a rating plug value at or below that value. In this example, a 500 Amp rating plug is selected. The derating value would be 50% and the corresponding gain of 2 would be required to maximize analog to digital conversion in the microprocessor 140.

Further, the microprocessor 140 controls the gain switches 124 by supplying a control signal 128 to the respective gain switches 124. That is, the microprocessor 140 determines which of the plurality of gain switches 124 of the gain control unit 122 to enable and disable based upon the selected current rating, to appropriately set the gain switches 124 to a corresponding protection rating. In addition, a gain of the gain amplifier 126 is controlled by the microprocessor 140 via signals received from the gain switches 124 and a control signal received from the microprocessor 140. A derated signal corresponding to a protection level 30 times the input current is output from the gain amplifier 126 is fed into the A/D converter 130 of the microprocessor 140 as shown in FIG. 4.

Referring back to FIG. 4, the A/D converter 130 of the microprocessor 140 receives the derated signal from the gain circuits 122 and thereby controls the gain of the input current. According to an exemplary embodiment of the present invention, the derated signal read by the A/D converter 130 of the microprocessor 140 is maximized to reduce both the effect of noise and quantization error.

An advantage of an exemplary embodiment of the present invention is that of control the current gain of input current of the electronic trip unit 100 for a corresponding protection level based on a specified current rating read by the microprocessor 140 is enabled.

An advantage of exemplary embodiment of the present invention is that the protection pick-up level is increased to a very high level (i.e., 20 times, for example), by maximizing the input current signal through the gain switches 124 employed to reduce error. By reading a rating plug switch SW1-SW8, determining its corresponding rating value and then setting the gain switches 124 to the appropriate setting, maximum signal for each gain stage is obtained and a protection rating is maximized.

Figure 3:
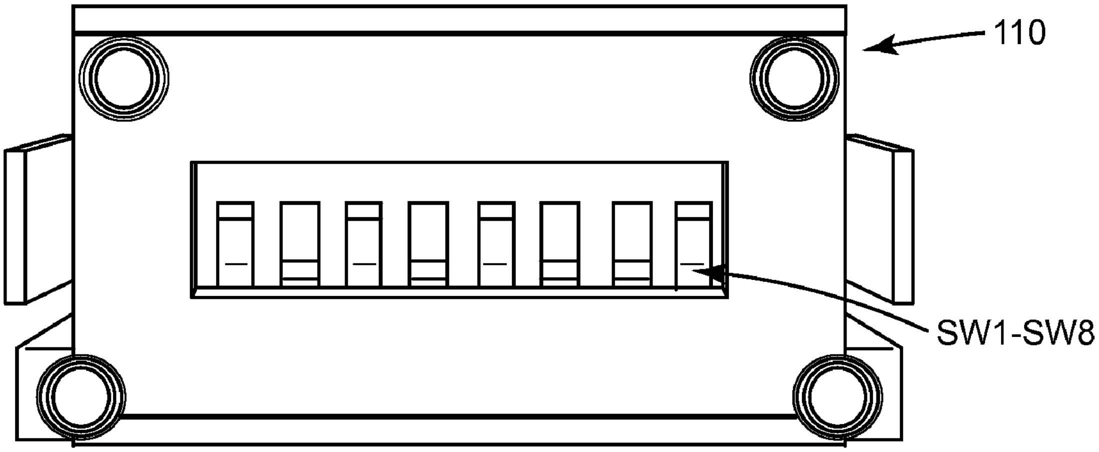
FIG. 3 illustrates a top view of a rating plug in accordance with an embodiment of the invention.

With reference now to FIGS. 3 and 5 the rating plug 110 includes toggle switches (SW1-SW8) accessible from the top of the rating plug that are factory preset to a digitally keyed rating plug current rating. As used herein, digitally keyed means mechanically set to provide a 0/1 digital representation. For example, a series of SW1-SW8 switch settings according to the digital key "10100110" is representative of a 2000 Amp rating plug current rating. In an embodiment, the first six binary digits are representative of the current rating, and the last two binary digits are used as a check-sum parity check. Once the switches are keyed, a label is placed over the top of the rating plug 110 to hide the switches and prevent access thereto. In an embodiment, the label is a tamper-proof label that is self-damaging if attempts are made to remove it, thereby providing visual indication of attempted tampering of the switch settings.

When plugged into the trip unit 100, one side of each switch 110 is connected to a 5 Volt source, and the other side is connected to the microprocessor 140 to provide logic thereto.

Embodiments of the electronic trip unit described herein and believed to have several advantages not found in trip units known before the making of this invention. Among these advantages are, for example, allowing use of the logic level signal (at 5 volts) to control the gain/filter circuit gain, while in the past it has been necessary to use a feedback resistor on the rating plug to set the gain. (Under this condition any rating plug connection problem due to correction or small misalignment will cause the gain to change which is highly undesirable as it will end up with a different value on the microprocessor A/D than the expected). Another advantage is that because a logic level signal can be used to control the gain/filter circuit gain, the microprocessor can read the percentage de-rating (or breaker rating) frame from the rating plug without any delay. Still another advantage over past technology is that while the rating plug has been used in combination with non-volatile memory where the de-rating is saved in the rating plug NVM (i.e., in this case the trip unit microprocessor needs to obtain a reading from the breaker rating from the rating plug non-volatile memory and then make trip decision base on this value; a very time consuming mechanism and one in which the breaker may not trip on time).

However, in the present instance, as soon as the unit is powered up, the gain is automatically determined and set (even before the microprocessor powers-up), allowing the microprocessor to read the switch for metering purposes only.

As disclosed, some embodiments of the invention may provide one or more of the following advantages: a universal rating plug for an electronic trip unit capable of accepting current sensors having different current ratings/values; a universal rating plug having a digital signature rather than an analog signature, thereby reducing noise effects that may influence a reading of the analog signature; a universal rating plug that allows a trip unit to be ordered without identifying the circuit breaker sensor current rating or the circuit breaker current frame that the rating plug is to be plugged into; a universal rating plug that allows a user to purchase a rating plug having a factory specified rating plug current rating (digital signature), and insert the rating plug into a trip unit in the field; a universal rating plug that provides for reduced stock keeping units (SKU's) and less inventory on a suppliers shelf, and, a universal rating plug that can be used on any circuit breaker that is accepting of the rating plug and has a sensor value equal to or greater than the rating plug current rating.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular exemplary embodiment disclosed as the best mode contemplated for carrying out this disclosure, but that the disclosure will include all embodiments falling within the scope of the appended claims.

What is claimed is:

1. A circuit breaker trip unit rating plug mountable to a trip unit, said trip unit comprising a voltage gain circuit, said voltage, gain circuit comprising an amplifier and a first plurality of switches for varying the voltage gain in said amplifier, said circuit breaker trip unit rating plug comprising:

a housing configured to removably secure said rating plug to said trip unit; and a second plurality of switches configured to control an analog switch on/off operation and operation of said first plurality of switches to indicate a specific fixed percentage de-rating and/or sensor and/or frame rating for said trip unit rating plug.

2. A circuit breaker trip unit rating plug according to claim 1, further configured to receive a voltage, and configured to communicate a signal from each of one said second plurality of switches to a microprocessor.

3. A circuit breaker trip unit rating plug according to claim 1 wherein said fixed percentage de-rating of said plug is between about 40% and 100%.

4. A circuit breaker trip unit rating plug according to claim 1, wherein said voltage gain circuit is configured to set a gain level on a voltage conditioning circuit comprising a feedback loop, by controlling at least one switch of said first plurality of switches, said at least one switch being configured in series with said feedback loop.

5. A circuit breaker having an electronic trip unit, the circuit breaker comprising:

a current sensor configured to provide a secondary analog signal proportional to the primary current sensed to said trip unit;

an amplifier in signal communication with said current sensor comprising a first plurality of switches configured to adjust the voltage gain of said amplifier;

a microprocessor in signal communication with said amplifier, configured, to provide a trip signal when said sensed primary current exceeds a predetermined threshold limit, said microprocessor comprising an internal analog to digital converter configured to process said analog signal from said current sensor, a rating plug having a housing configured to removably secure said rating plug to said trip unit, a second plurality of switches disposed within said rating plug housing adapted to control said first plurality of switches on/off operation to indicate a specific percentage de-rating and/or sensor and/or frame rating for said plug, wherein each of said second plurality of switches is positionable in one of two positions.

* * * * *